United States Patent

Ishikawa et al.

[11] Patent Number: 4,667,061
[45] Date of Patent: May 19, 1987

[54] GAS INSULATED APPARATUS WITH INTERNAL COATED INSULATION LAYER OF HIGH DIELECTRIC CONSTANT

[75] Inventors: Toshio Ishikawa; Fumihiro Endo; Tokio Yamagiwa; Yuzuru Kamata, all of Hitachi, Japan

[73] Assignee: Hitachi, Ltd., Tokyo, Japan

[21] Appl. No.: 718,282

[22] Filed: Apr. 1, 1985

[51] Int. Cl.⁴ .......................... H01B 9/06; H02G 5/06
[52] U.S. Cl. ..................................... 174/14 R; 174/28
[58] Field of Search .............. 174/14 R, 16 B, 17 GF, 174/28; 361/311, 312

[56] References Cited

U.S. PATENT DOCUMENTS 2,046,476  7/1936  Meissner ..................... 361/311 X
3,194,782  7/1965  Devaney et al. ............. 361/312 X

FOREIGN PATENT DOCUMENTS 55-136811  10/1980  Japan ........................... 174/14 R Primary Examiner—Laramie E. Askin
Attorney, Agent, or Firm—Antonelli, Terry & Wands

[57] ABSTRACT

A gas insulated electrical apparatus comprises: a metal pipe in which an insulation gas is sealed; a conductor supported inside of the metal pipe by an insulation supporting member; and an insulation layer provided on the inner surface of the metal pipe. Strong dielectric material is mixed in the insulation layer so that its specific inductive capacity becomes ten or more.

5 Claims, 11 Drawing Figures

GAS INSULATED APPARATUS WITH INTERNAL COATED INSULATION LAYER OF HIGH DIELECTRIC CONSTANT

BACKGROUND OF THE INVENTION

The present invention relates to a gas insulated electrical apparatus and, more particularly, to a gas insulated electrical apparatus with an arrangement for a prevention of reduction in dielectric strength of the apparatus even in the state whereby a conductive particle is mixed into the gas insulated electrical apparatus.

In many cases, gas insulated electrical apparatuses are used as an arrangement in which a high voltage structure member as a current supplying conductor is arranged in a metal pipe in which a negative gas, for instance, $SF_6$ gas, is sealingly enclosed. In the event that a conductive particle is mixed into this apparatus and drops and is deposited onto the bottom portion of the pipe, this conductive particle rises from the inner surface of the pipe in dependence upon an electric field of the inside of the pipe and floats in the gas space. The dielectric strength of the gas space remarkably deteriorates due to this floating conductive particle. To assure insulation reliability of the apparatus, it is necessary to provide an arrangement which prevents an influence of such a conductive particle.

To solve this problem, in, for example, Japanese Patent Application Laid-Open No. 136811/80, an apparatus is proposed which includes an arrangement in which, by forming an insulation layer having a high dielectric constant on the inner surface of a pipe, a strong electrostatic attracting force capable of overcoming an electrostatic floating force that acts on a conductive particle acts between the conductive particle and the bottom portion of the pipe due to a voltage which is applied to the apparatus and suppresses the floating motion of the conductive particle. In this case, it is necessary to form the insulation layer using high dielectric material whose specific inductive capacity is larger than a predetermined value. Conventionally, a specific inductive capacity of an organic high molecular compound cannot be more than six. Although a specific inductive capacity of an inorganic compound such as sintered barium titanate can be thousands, the sintered barium titanate or the like is fragile and cannot be machined. Furthermore, it is difficult to fit the sintered barium titanate to an inner surface of a pipe having a round surface.

On the other hand, it is necessary to increase the electrostatic attracting force to attract a conductive particle on the insulation layer and to further improve the insulation performance of the apparatus.

SUMMARY OF THE INVENTION

It is an object of the present invention to increase a force to attract a conductive particle on an insulation layer and to provide a gas insulated electrical apparatus in which an insulation layer which can be semipermanently and stably fixed onto the inner surface of a pipe is formed.

According to the present invention, the insulation layer includes a coated layer formed by a mixed fluid of which fine powders, having a high dielectric constant, are dissolved as filler material into binder fluid. A specific inductive capacity of the coated layer can be adjusted in dependence upon the mixture ratio of the filler material and the specific inductive capacity of the filler material. It has been experimentally confirmed that when the coated layer was formed so that its specific inductive capacity becomes ten or more, the floating action of conductive particles which were put on the coated layer was suppressed. In this manner, the invention is formed by the coated layer of the mixed fluid as a means for semipermanently and stably disposing a thin film insulation layer of high dielectric constant on the inner surface of the apparatus.

In addition, according to the invention, to increase the electrostatic attracting force of the insulation layer, a conductive electrode is formed on one side of the insulation layer.

BRIEF DESCRIPTION OF THE DRAWINGS

The invention will be described in detail with reference to the accompanying drawings, in which.

DETAILED DESCRIPTION

Figure 1:
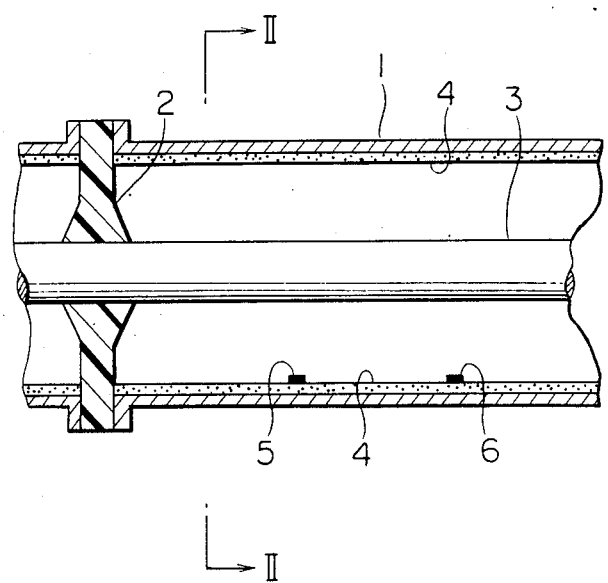
FIG. 1 is a vertical cross sectional view taken along the line I—I in FIG. 2 of a gas insulated electrical apparatus provided with an insulation layer according to the first embodiment of the present invention.
Figure 2:
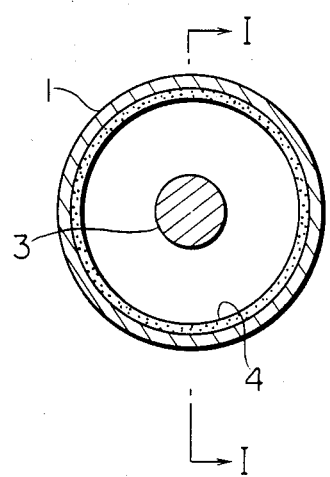
FIG. 2 is a transverse cross sectional view taken along the line II—II of FIG. 1.

Referring to FIGS. 1 and 2, a gas insulated electrical apparatus includes a high voltage conductor 3 insulatively supported by an insulation supporting member 2 in a grounded metal pipe or grounded tank 1, with an insulating gas sealingly enclosed in the metal pipe or grounded tank 1. An insulation layer 4 of the high dielectric system, formed on the inner surface of the pipe 1, is formed by a coated layer formed by coating mixed fluid wherein fine powders of strong dielectric material, for example, ferroelectric material are dissolved in a binder fluid.

An electrostatic attracting force capable of overcoming an electrostatic floating force dependent upon a generated electric field acts on conductive particles 5, 6 which drop and are deposited on the insulation layer 4 between these conductive particles and the bottom portion of the pipe 1, so that the floating action of the conductive particles 5, 6 which could be mixed into the apparatus is prevented.

In order to obtain the electrostatic attracting force enough to effectively prevent the floating action of the conductive particles, it is necessary to make a specific inductive capacity of the insulation layer larger than ten. However, this specific inductive capacity is determined by specific inductive capacities of the binder fluid and filler material and further by the mixture ratio of them.

Figure 3:
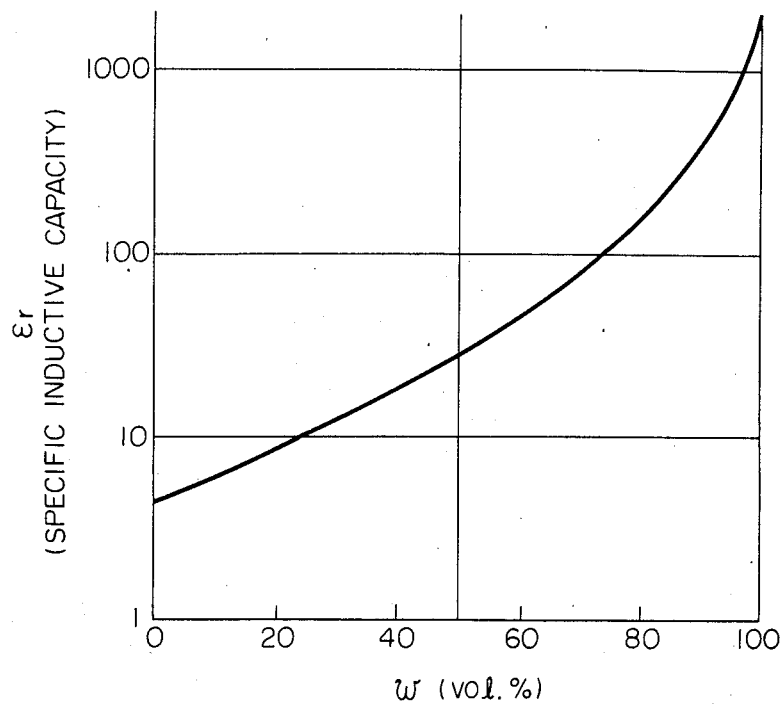
FIG. 3 is a graphical illustration of a relationship between the mixture ratio of a binder fluid and filler material and the specific inductive capacity.

FIG. 3 illustrates a relationship between the mixture ratio in the case where a general undiluted coating fluid for facing (solvent 40%, raw material 60%) is used as the binder fluid and fine powders of barium titanate ceramic are used as the filler material and the specific inductive capacity of the coated layer formed from that mixed fluid. A specific inductive capacity $\epsilon_r$ of the coated layer can be raised by increasing a mixture amount $\omega$ of the filler material. The condition of $\epsilon_r \geq 10$ can be attained by $\omega \geq 20$ (%, vol). On one hand, the relationship between the mixture ratio and specific inductive capacity shown in FIG. 3 mainly varies in dependence upon the specific inductive capacity of the filler material; and $\epsilon_r$ can be effectively increased by use of the filler material of a large specific inductive capacity.

In addition, as the binder fluid, a fluid having a strong solidifying strength is desirable and it is possible to derive effects such that the adhesive property of the coated layer onto the inner surface of the pipe 1 is made strong and the insulation layer 4 can be semipermanently and stably fixed.

By use of anticorrosive coating material or the like as the binder fluid for the purpose of protection of the metal surface, an effect such that the insulation layer also has a metal surface protecting function such as anticorrosion or the like is derived.

On one hand, as material of the binder fluid, it is possible to use phenol resin, urea resin, melamine resin, alkyd resin, polyester resin, epoxy resin, vinyl system resin, polystyrene, acrylic resin, polyamide resin, fluoro resin, ester phthalate, or the like. In addition, it is also possible to use coating material and varnish containing any of the above-mentioned materials as main raw material.

Although an example whereby barium titanate ceramic is used as the filler material has been shown in the above, it is also possible to employ lithium tantalate, sodium niobate or lithium niobate as the strong dielectric material, or fine powders of lead titanate or the like, or solid solution thereof. The mixture ratio of volumes of the binder fluid and filler material to set the specific inductive capacity $\epsilon_r$ to be 10 or more could be attained when the filler material is over 20% in case of using barium titanate. The results in case of using other materials will then be mentioned below. The specific inductive capacity $\epsilon_r$ is over ten in the cases where: lead titanate is over 25% as the volume ratio; lithium tantalate is over 10%; lithium niobate is over 10%; and sodium niobate is over 20%.

Figure 4:
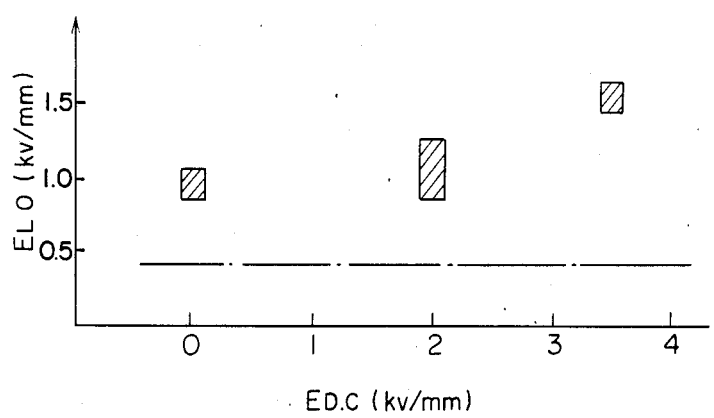
FIG. 4 is a graphical illustration of a relationship between the electric field of an insulation layer to attract a conductive particle and the DC electric field when the insulation layer is polarization-processed.

On the other hand, by performing a polarization process by applying a DC electric field to the insulation layer 4, the specific inductive capacity of the insulation layer 4 can be further raised, so that the electrostatic attracting force can be further increased. FIG. 4 shows an example of the relationship between an attracting electric field (electric field strength ($E_{LO}$) at the inner surface of the pipe when the conductive particles are removed from the surface of the insulation layer) of the conductive particles which are put on the insulation layer and a DC electric field $E_{DC}$ upon polarization-processing. The hatched rectangle in the left portion of FIG. 4 represents the electric field strength $E_{LO}$ of the insulation layer in which the polarization process is not performed, the electric field strength being about 0.85 to 1.05 kv/mm. The hatched rectangle in the center portion of FIG. 4 represents the electric field strength $E_{LO}$ of the insulation 4 in which the polarization process of $E_{DC}=2kv/mm$ is performed, with the electric field strength being about 0.85 to 1.25 kv/mm. The hatched rectangle in the right portion of FIG. 4 represents the electric field strength $E_{LO}$ of the insulation layer 4 in which the polarization process of $E_{DC}=3.5$ kv/mm is performed, the electric field strength being about 1.4 to 1.6 kv/mm. There is a case where the attracting electric field when the polarization-process is performed due to $E_{DC}=2(kv/mm)$ is nearly as low as that of $E_{DC}=0(kv/mm)$, in which the polarization-process is not performed. On the contrary, in the case where the polarization-process is performed due to $E_{DC}=3.5(kV/mm)$, a value of $E_{LO}$ can be remarkably improved as compared with those in the former two cases. It is possible to derive an effect of further remarkable improvement than that of a bare electrode (in the state whereby the metal surface where no insulation layer is formed is exposed) indicated by an alternately long and short dash line in FIG. 4. It will be understood from this result that when the polarization-process is performed so as to satisfy the condition of $E_{DC}>2$ kV/mm, the effect of formation of the insulation layer can be efficiently utilized as much as possible.

As a method of polarization-processing, after the insulation layer 4 is formed on the inner surface of the pipe 1, a DC voltage is applied between the pipe 1 and the conductor 3, thereby allowing an electric field of over 2 kV/mm to be generated.

According to the first embodiment of the invention, the attracting force between the insulation layer and the particle is improved; the insulation layer can be easily formed on the inner surface of the pipe by spray-coating the binder fluid in which the filler material was mixed or the like; its forming means is remarkably simplified; and the adhesive property with the inner surface of the pipe is strengthened.

Figure 5A:
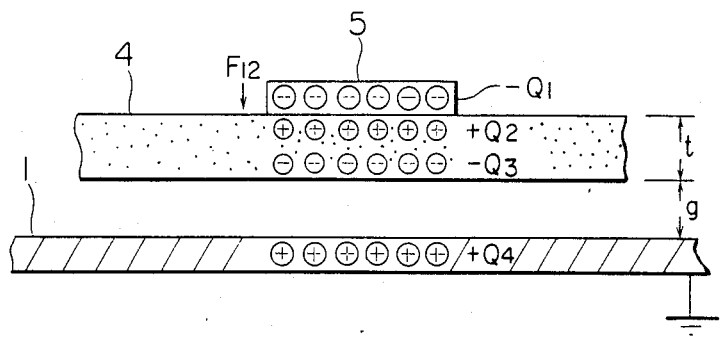
FIGS. 5A and 5B are schematic cross-sectional views illustrating a principle of the second embodiment of the invention.
Figure 5B:
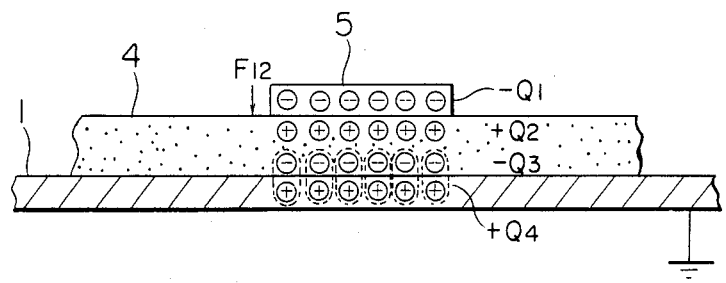

As shown in FIG. 5A the insulation layer 4 is a dielectric plate or is formed by mixing strong dielectric material mentioned before into the resin described above or a material of film such as polyethylene. In case of disposing the dielectric plate 4 onto the inner surface of the pipe 1, a gap g will have been caused between the inner surface of the pipe 1 and the dielectric plate due to limitation in working accuracy, surface roughness of the inner surface of the pipe 1, or the like. When the particles 5, charged to a charge amount of $-Q_1$, come on the dielectric plate, the charges of the opposite polarity of $+Q_2$ commensurate with those charged particles, are induced in the dielectric plate 4 on the side of the particles. On the contrary, the charges of $-Q_3$ ($Q_3=Q_2$) are induced in the surface on the opposite side as shown in the diagram. Further, the charges of $+Q_4$ of the polarity opposite to that of $-Q_3$ are induced in the inner surface of the pipe 1 with a distance corresponding to the gap g. Under such situation, an attracting force $F_{12}$ to the particles 5 is determined by the charge amount $-Q_1$ of the charged particles, charge amount $+Q_2$ which is induced in the surface of the dielectric plate and the distance therebetween. However, in the case where a thickness t of the dielectric plate 4 is thin, the repulsion force, induced in the back surface of the dielectric plate due to the charges $-Q_3$ of the same polarity as that of the particles, cannot be ignored, so that the attracting force is not sufficiently utilized. On the other hand, as shown in FIG. 5B, if the back surface of the dielectric plate 4 is closely adhered to the inner surface of the pipe 1, $-Q_3$ and $+Q_4$ are mutually neutralized. Thus, the repulsion force due to $-Q_3$ can be ignored and the attracting force $F_{12}$ between $-Q_1$ and $+Q_2$ is sufficiently utilized, thereby making it possible to obstruct the floating of the particles.

Figure 6:
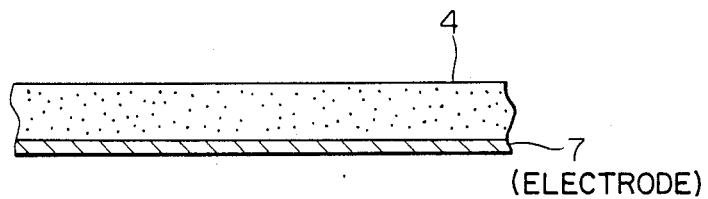
FIG. 6 is a partial cross sectional view of the second embodiment of the invention.

Since the charges $-Q_3$ and $+Q_4$ are mutually set off, as shown in FIG. 6, conductive material is adhered, sprayed or the like onto the back surface of the dielectric plate 4 (surface which comes into contact with the inner surface of the pipe 1), thereby forming an electrode 7.

Figure 7:
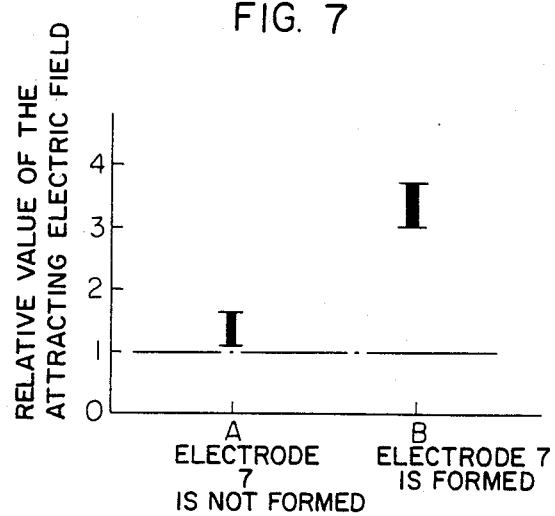
FIG. 7 is a graphical illustration showing that the force to attract the conductive particle on the insulation layer is improved due to the second embodiment of the invention.

FIG. 7 is a graph showing the effect which is obtained by forming the electrode 7 on the dielectric plate 4. An axis of ordinate indicates the relative value of the attracting electric field to attract the particles, in which the case where no dielectric plate exists is shown as 1. A of an axis of abscissa represents the dielectric plate on which the electrode 7 is not formed. In this case of A, the attracting electric field is slightly improved as compared with the conventional case where no dielectric plate exists; however, an enough effect is not derived. On the other hand, B indicates the dielectric plate on which the electrode 7 is formed and it will be understood that the attracting electric field can be improved to about three times better than that in the conventional case. Namely, according to the second embodiment of the invention, the attracting electric field of the particles can be extremely improved, so that even in the event that a particle is mixed into the gas insulated apparatus, the floating of the particle in the state whereby a voltage is applied to the apparatus can be prevented, so that the insulation reliability can be improved.

Figure 8:
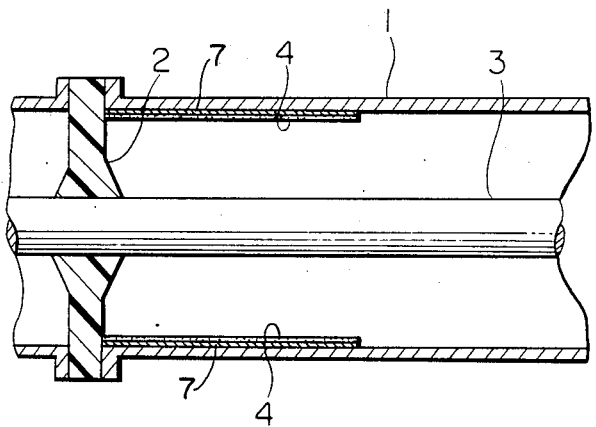
FIGS. 8, 9 and 10 are partially schematic cross-sectional views of modified forms of the first and second embodiments of the invention.
Figure 9:
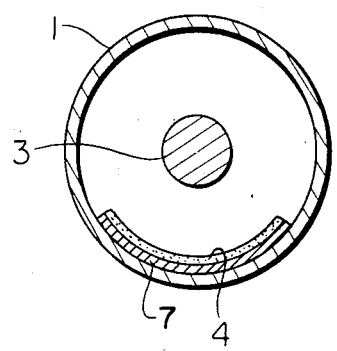

With respect to an arrangement of the dielectric plate, there is no need to dispose it on the whole inner surface of the grounded tank. As shown in FIG. 9, even if the dielectric plate is disposed on only the bottom portion of the tank, a sufficient effect can be expected in case of considering the action of the particles. In addition, there is no need to dispose the dielectric plate along the whole length of the tank, the dielectric plate may be partially arranged as shown in FIG. 8 as well.

Figure 10:
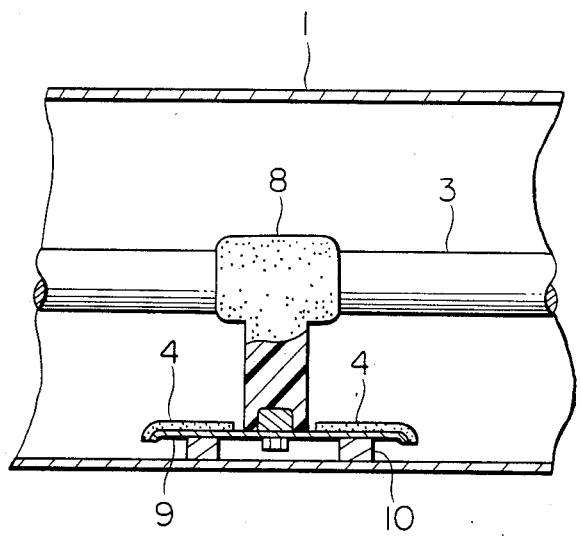

On the other hand, as shown in FIG. 10, the dielectric plate can be also disposed only near an insulation supporting member such as an insulating spacer 8 or the like which can be easily affected by the particles. In FIG. 10, reference numerals 9 and 10 denote metal fittings for supporting and fixing the spacer 8. In this case, the dielectric plates 4 according to the invention are formed by closely adhering the dielectric plates 4 on the upper surfaces of the supporting metal fittings 9, so that a similar effect as that shown in FIG. 5B is derived. Further, there is no need to fix the dielectric plates on the bottom surface of the grounded tank but they can be built in integrally with the insulating spacer, so that this arrangement is advantageous in terms of manufacturing.

We claim:

1. A gas insulated electrical apparatus comprising:
   a metal pipe in which an insulation gas is sealed;
   a conductor supported inside of said metal pipe by an insulation supporting member;
   an insulation layer provided on an inner surface of said metal pipe, said insulation layer including a strong dielectric material such that a specific inductive capacity of the insulation layer is at least 10 or more; and
   an electrode plate or sheet formed on the surface of said insulation layer facing the inner surface of said metal pipe.

2. A gas insulated electrical apparatus according to claim 1, wherein said insulation layer is arranged near said supporting member.

3. A gas insulated electrical apparatus according to claim 1, wherein said insulation layer is polarized due to the electric field strength of 2 kV/mm or more.

4. A gas insulated electrical apparatus according to claim 1, wherein said strong dielectric material is barium titanate.

5. A gas insulated electrical apparatus comprising:
   a metal pipe having an insulation gas sealed therein;
   an insulation supporting means for supporting a conductor inside of said metal pipe;
   a plate or sheet-like insulation layer provided on an inner surface of said metal pipe, said insulation layer having ferroelectric material so that a specific inductive capacity of said insulation layer is at least 10 or more; and
   an electrode formed on the surface of said insulation layer, said surface of said insulation layer being disposed opposite to the inner surface of said metal pipe so that said electrode sets off charges induced in said insulation layer each having a polarity which is equal to a polarity of a charge in a conductor particle floating in said metal pipe.

* * * * *